(12) United States Patent
Keast (10) Patent No.: US 8,727,039 B1
(45) Date of Patent: *May 20, 2014

(54) TORQUE MEASURING TOP DRIVE

(76) Inventor: Larry G. Keast, Houston, TX (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/301,520

(22) Filed: Nov. 21, 2011

Related U.S. Application Data (60) Provisional application No. 61/420,672, filed on Dec. 7, 2010.

(51) Int. Cl.
*E21B 3/06* (2006.01)
*G01L 3/00* (2006.01)

(52) U.S. Cl.
USPC .... 175/40; 175/203; 73/862.338; 73/862.627

(58) Field of Classification Search
USPC ........... 166/250.01, 380, 77.51, 77.52, 77.53, 166/85.4; 175/40, 203; 73/862.338, 73/862.627, 849, 862.04, 781, 862.044, 73/862.045, 862.474
See application file for complete search history.

(56) References Cited

U.S. PATENT DOCUMENTS

| | | | | |
|---|---|---|---|---|
| 3,695,096 A * | 10/1972 | Kutsay | ............................. | 73/761 |
| 4,165,637 A * | 8/1979 | Kooman | .................. | 73/862.631 |
| 4,176,436 A * | 12/1979 | McCombs et al. | ............... | 29/240 |
| 4,516,646 A * | 5/1985 | Bergfalk | ........................ | 177/211 |
| 4,576,053 A * | 3/1986 | Hatamura | ................. | 73/862.629 |
| 4,715,451 A * | 12/1987 | Bseisu et al. | ..................... | 175/40 |
| 5,144,298 A * | 9/1992 | Henneuse | ................... | 340/854.6 |
| 5,272,925 A * | 12/1993 | Henneuse et al. | ........ | 73/862.541 |
| 7,108,081 B2 * | 9/2006 | Boyadjieff | ....................... | 175/40 |
| 7,683,274 B2 * | 3/2010 | Dellac et al. | ................... | 177/211 |
| 7,757,759 B2 * | 7/2010 | Jahn et al. | ................ | 166/250.01 |
| 7,921,939 B1 * | 4/2011 | Keast et al. | .................... | 175/113 |
| 7,984,757 B1 * | 7/2011 | Keast et al. | ................... | 166/77.1 |
| 8,047,283 B2 * | 11/2011 | Jahn et al. | ................ | 166/250.01 |
| 8,127,836 B1 * | 3/2012 | Keast et al. | ................... | 166/77.1 |
| 8,181,721 B1 * | 5/2012 | Keast | ............................ | 175/195 |
| 8,281,856 B2 * | 10/2012 | Jahn et al. | ................ | 166/250.01 |
| 2005/0167157 A1 * | 8/2005 | Boyadjieff | ....................... | 175/57 |
| 2008/0125876 A1 * | 5/2008 | Boutwell | ........................ | 700/21 |
| 2008/0202810 A1 * | 8/2008 | Gomez | ............................ | 175/40 |
| 2009/0050368 A1 * | 2/2009 | Griffin et al. | .................. | 175/40 |
| 2010/0068049 A1 * | 3/2010 | Thermos et al. | ............ | 415/209.3 |
| 2011/0024188 A1 * | 2/2011 | Wassell et al. | .................. | 175/40 |
| 2012/0181083 A1 * | 7/2012 | Fallen | ............................ | 175/40 |

* cited by examiner

*Primary Examiner* — Blake Michener
(74) *Attorney, Agent, or Firm* — Buskop Law Group, PC; Wendy Buskop (57) ABSTRACT

A torque measuring device for top drives, which includes plates mounted to a top drive. A torque measuring pin and a hinge pin can be engaged with the plates and a torque slide assembly. Bosses can be connected to the top drive, and can have the torque measuring pin engaged therethrough to restrain vertical and axial movement between the plates. A boss can be connected to the top drive and engaged with the torque measuring pin to bend the torque measuring pin when torque is applied to the top drive. One or more bosses can be connected to the top drive, and can have the hinge pin engaged therethrough to hinge the plates to the top drive. A strain gauge sensor can be engaged with the torque measuring pin. A controller can be in communication with the strain gauge sensor to receive signals therefrom.

20 Claims, 9 Drawing Sheets

TORQUE MEASURING TOP DRIVE

CROSS REFERENCE TO RELATED APPLICATIONS

The present application claims priority to and the benefit of U.S. Provisional Patent Application Ser. No. 61/420,672 filed on Dec. 7, 2010, entitled "TORQUE MEASURING TOP DRIVE." This reference is hereby incorporated in its entirety.

FIELD

The present embodiments generally relate to a top drive having a torque measuring device.

BACKGROUND

A need exists for a top drive having a torque measuring device that can be calibrated, eliminating or reducing inaccuracies associated with conventional top drives used for drilling wells.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a top drive having a torque measuring device.

The top drive can be used on a drilling rig, such as an oil derrick or a tower, for drilling a wellbore.

Top drives can be suspended from a crown of a derrick, such as by using a torque track, for drilling oil and natural gas wells.

A bottom of the torque track can be connected to a bottom of the drilling rig, such as to a rig floor or a rig floor substructure.

A traveling block, such as a traveling block with a hook, can be secured to a cable and to a crown block of the derrick.

A cable can extend from the traveling block and over at least one sheave mounted to a top of the derrick adjacent the crown block. The cable can be connected to a drawworks. A drawworks motor can be used to turn the drawworks and raise or lower the top drive with the cable.

The top drive housing can support the top drive for connection to the cable, which can be moveable by the drawworks and the drawworks motor.

The top drive housing can be made from steel and can be configured to support a rotating stem, also referred to as a main shaft, which can be mounted therein.

The rotating stem can be spinably connected with a motor, such as a hydraulic motor. The motor can be connected with the top drive housing. In one or more embodiments, the motor can at least partially extend into the top drive housing.

A heavy thrust bearing can be disposed around the rotating stem within the top drive housing.

A first lower link can be connected or pinned to the top drive housing, and a second lower link can be connected or pinned to the top drive housing opposite the first lower link.

The lower links can extend from the top drive housing and can be connected to an elevator, which can be a manual or hydraulic elevator. The top drive can include at least one elevator hydraulic cylinder that can be used to kick out the elevator to grab a tubular or a stand of tubulars from a pipe rack, a V-door, a mouse hole, or another location.

An inside blow out preventer can be connected to the rotating stem opposite from where the rotating stem is mounted to the top drive housing, such as to a bottom end of the rotating stem.

An upper clamp assembly can lock the connection between the rotating stem and the inside blow out preventer.

A saver sub can be connected to the inside blow out preventer opposite the inside blow out preventer.

A lower clamp assembly, which can be the same type of clamp as the upper clamp assembly, can lock the connection between the inside blow out preventer and the saver sub.

In one or more embodiments, each clamp assembly can include one or more tong dies for preventing backing out or breaking off of any tool joint connections in the top drive, such as threaded connections between tubulars.

The top drive can include a torque wrench assembly that can be connected to the top drive housing, a torque slide assembly, or combinations thereof.

The torque slide assembly can be configured to slide on the torque track on the derrick.

The torque track can be suspended from the crown of the derrick of the drilling rig. In one or more embodiments, the torque track can be hanging loose and can be only slightly tensioned, such that no torque loads are imparted onto the derrick. The torque track can be connected to a rig floor substructure opposite the crown.

The torque slide assembly can include a body, also referred to as a slide body, a top plate engaged with the top drive housing, a bottom plate engaged with the top drive housing, and a torque assembly door.

The torque assembly door can be a rotatable slide door that can be engaged around a rectangular torque reaction tube. The rotatable slide door can provide for easy installation and removal of the rectangular torque reaction tube.

The torque wrench assembly can include a pair of torque supporting telescoping rectangular tubes for supporting a torque load with only telescoping movement.

The torque wrench assembly can include a hydraulic cylinder with a first end, a second end, and a single hollow cylinder rod disposed therethrough.

The hydraulic cylinder can be disposed inside the torque supporting telescoping rectangular tubes. A single hollow cylinder rod can be moveably positionable within the hydraulic cylinder, such that the single hollow cylinder rod can moveably extend out of the first end and the second end of the hydraulic cylinder.

The torque slide assembly, the top drive housing, the top plate, and the bottom plate can provide protection from external forces to the area therein.

In one or more embodiments, the torque measuring device can be attached to a top drive housing of the top drive. The torque measuring device can include a first plate opposite a second plate mounted to the top drive housing.

One or more embodiments can include a torque measuring pin with a torque measuring pin head and a torque measuring pin body. The torque measuring pin can have a pin head flat side for orientation against a fixed surface of the first plate, providing for a smooth engagement between the torque measuring pin and the first plate.

The torque measuring pin can engage with the first plate, the torque slide assembly of the top drive, and the second plate for securing the torque slide assembly to the top drive housing. The torque slide assembly can have a torque slide assembly slide body, a torque slide assembly top plate, a torque slide assembly bottom plate, and a torque reaction tube, which can be a rectangular torque reaction tube.

In embodiments, the torque measuring pin body can include a torque measuring pin hole for engaging a first restraining member. The torque measuring pin hole can be inserted into a flexible bushing to centralize the first restraining member in the torque measuring pin hole, and to hold the torque measuring pin head above the first plate, thereby preventing dragging of the torque measuring pin head when the torque measuring pin body bends, which can change an accuracy of torque measurement.

The torque measuring device can include a hinge pin, which can have a constant diameter. The hinge pin can have a hinge pin head and a hinge pin body for securing the torque slide assembly of the top drive to the top drive housing. The hinge pin can engage with the first plate, the torque slide assembly, and the second plate for securing the torque slide assembly of the top drive to the top drive housing.

In embodiments, the hinge pin body can include a second pin hole for engaging a second restraining member. Each pin hole can range in diameter from about one-quarter of an inch to about three inches, depending upon a size of the top drive.

A first boss can be connected to the top drive housing to hold and contain a segment of the torque measuring pin.

The first boss can have a first bore with a first bore diameter to allow the torque measuring pin to pass through the first bore without touching the first bore. A segment of the torque measuring pin body can be surrounded by the first boss.

The torque measuring pin can engage through the first boss or the first bore without engaging the first bore or the first boss. The first boss can be configured to restrain vertical movement between the first plate and the second plate when torque is applied to the top drive.

A second boss can be connected to the top drive housing. The second boss can have a second bore with a second bore diameter. The second bore can be aligned with the first bore.

The second bore diameter can be configured to allow deflection of the torque measuring pin body without engaging the torque measuring pin body. The second bore diameter can allow the torque measuring pin to pass through the second bore without touching the second bore. The second boss can surround a segment of the torque measuring pin body.

The segment of the torque measuring pin body that can be surrounded by the second boss, can be located opposite from the segment of the torque measuring pin body surrounded by the first boss.

The torque measuring pin can engage through the second boss or the second bore without engaging the second boss or the second bore. The second boss can be configured to restrain axial movement between the first plate and the second plate when torque is applied to the top drive.

A third boss can be connected to the top drive housing to provide central bending contact to the torque measuring pin. The third boss can have a third bore with a third bore diameter. The third bore can be aligned with the first bore and the second bore.

The torque measuring pin can engage through the third boss. The third bore can be configured to engage the torque measuring pin body to bend the torque measuring pin when torque is applied to the top drive. For example, the third bore diameter can be equal to a diameter of the torque measuring pin proximate the third bore, allowing the torque measuring pin to bend when torque is applied to the torque measuring pin simultaneously by the first plate and the second plate, and allowing the third boss to react to the applied torque.

A fourth boss can be in parallel with the first boss and connected to the top drive housing. The fourth boss can have a fourth bore with a fourth bore diameter to receive the hinge pin body in a close alignment. The hinge pin can engage through the fourth boss to hinge the first plate and the second plate to the top drive housing.

A fifth boss can be connected to the top drive housing in parallel with the second boss. The fifth boss can have a fifth bore with a fifth bore diameter to receive the hinge pin body in a close alignment. The hinge pin can engage through the fifth boss to hinge the first plate and the second plate to the top drive housing.

A sixth boss can be connected to the top drive housing in parallel with the third boss. The sixth boss can have a sixth bore with a sixth bore diameter to receive the hinge pin body in a close alignment. The hinge pin can engage through the sixth boss to hinge the first plate and the second plate to the top drive housing.

In one or more embodiments, the fourth boss, the fifth boss, and the sixth boss can have the equal diameters.

The torque measuring pin can have a torque measuring pin body with at least two different diameters. For example, the torque measuring pin body can have three different diameters, such as a first pin diameter, a second pin diameter, and a third pin diameter.

A bidirectional strain gauge sensor can be connected to or otherwise engaged with the torque measuring pin. An illustrative bidirectional strain gauge sensor can be one made by Dynasen of Goleta, Calif. The bidirectional strain gauge sensor can measure strain or torque from the torque measuring pin and can produce signals therefrom.

A controller, which can be an electronic controller, can be connected to or otherwise engaged with the bidirectional strain gauge sensor. The controller can be in communication with the bidirectional strain gauge sensor for receiving the produced signals from the bidirectional strain gauge sensor. For example, the controller can be connected to the bidirectional strain gauge sensor with wires or through a wireless communication.

The controller can be in communication with a power supply. The power supply can be one or more batteries or a 110 volt power source. The controller can include a processor with a data storage. Computer instructions for calibrating can be stored in the data storage.

The controller can use the signals from the bidirectional strain gauge sensor to detect measurable pin body movement or bending of the torque measuring pin. The detected measurable pin body movement or bending can be calibrated in torque for detecting forward and reverse bending of the torque measuring pin body.

In one or more embodiments, the processor of the controller can be configured to execute computer instructions in the data storage to compare received signals of the measured torque sensed by the bidirectional strain gauge sensor to preset limits stored in the data storage. As such, the controller can determine torque strain on the top drive continuously during operational use of the top drive, can determine whether or not the measured torque is within preset limits, and can transmit the determined torque strain and compliance with preset limits to users for use in operation of the top drive. For example, the preset limits can be an amount of torque above which the top drive should not be operated at, an amount of torque below which the top drive should not be operated, or combinations thereof.

Figure 1:
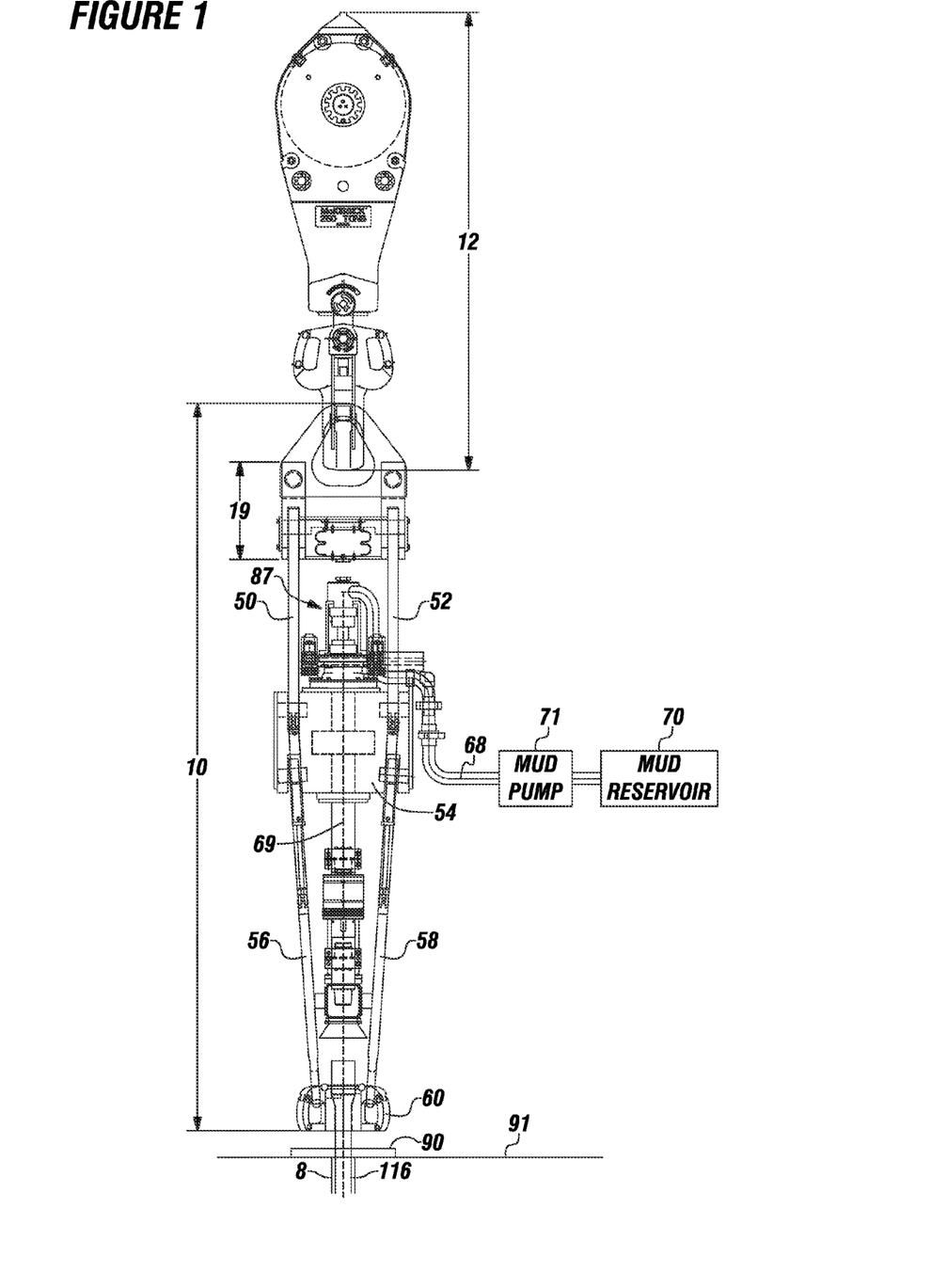
FIG. 1 depicts a top drive according to one or more embodiments.

Turning now to the Figures, FIG. 1 depicts a side view of an embodiment of a top drive 10 engaged with a travelling block 12.

The top drive 10 can include a pneumatic thread compensator 19, a first upper link 50, a second upper link 52, a top drive housing 54 connected to both upper links 50 and 52, a first lower link 56 and a second lower link 58 connected to the top drive housing 54, and an elevator 60 connected to both lower links 56 and 58.

The top drive 10 can be used for engaging a tubular or a stand of tubulars, such as tubular 116, which can be a drill pipe extending from a rig floor 90, through a rig floor substructure 91, and into a wellbore 8.

The top drive 10 can include a mud pump 71 in fluid communication with a mud reservoir 70 for flowing a pressurized mud 68 to a wash pipe packing seal assembly 87.

The wash pipe packing seal assembly 87 can be connected to the top drive housing 54. The pressurized mud 68 can flow along a central mud flow path 69, to a drill bit that can be connected to the tubular 116.

Figure 2:
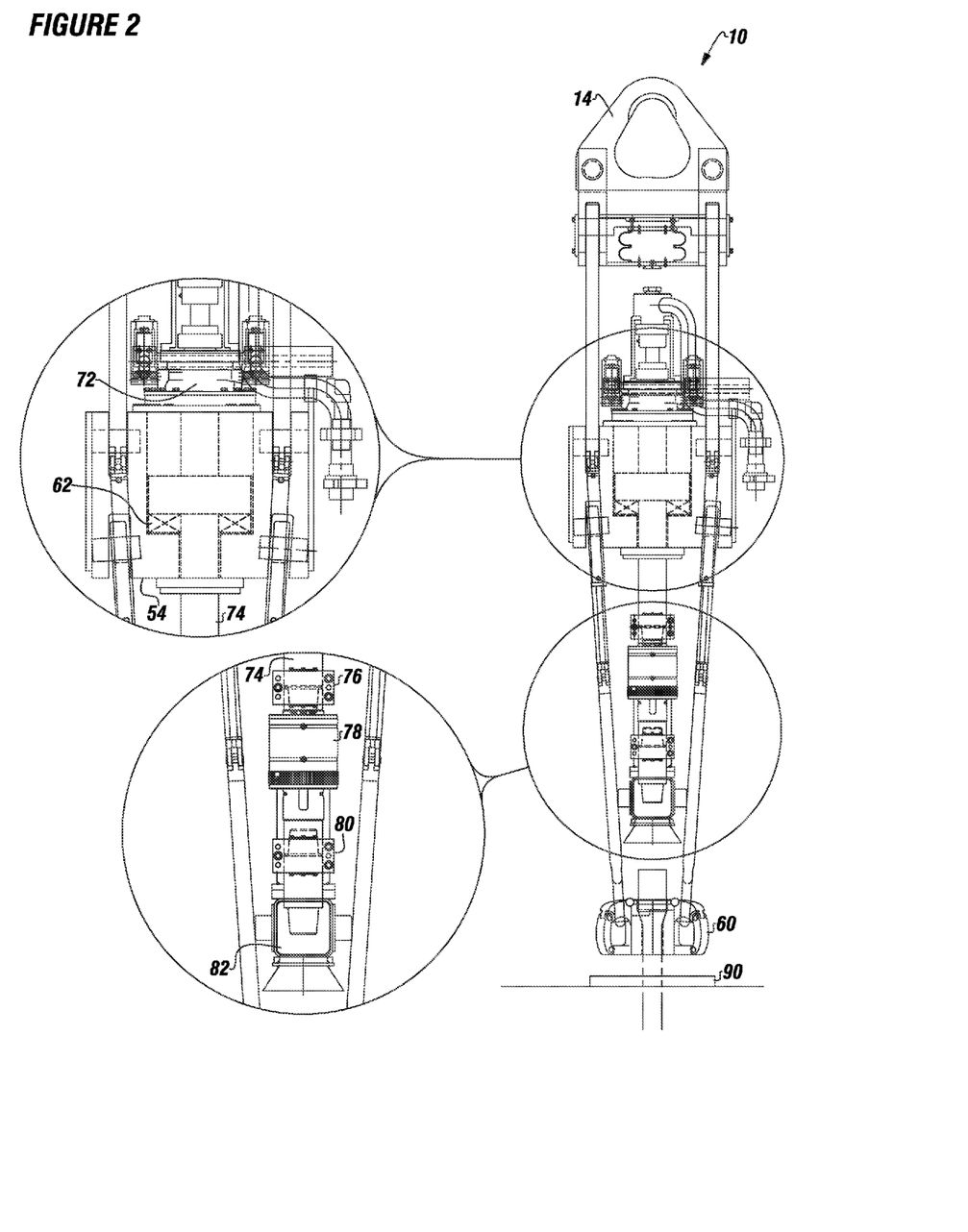
FIG. 2 depicts a detailed view of portions of a top drive.

FIG. 2 depicts a view of a torque measuring portion of the top drive 10.

The top drive 10 can include or be connected to a bail 14. The bail 14 can be engaged with the travelling block.

The top drive housing 54 can support a rotating stem 74, which can be mounted therein.

The rotating stem 74 can be spinably connected with a motor 72. The motor 72 can be connected with the top drive housing 54.

A heavy thrust bearing 62 can be disposed about the rotating stem 74 within the top drive housing 54.

An inside blow out preventer 78 can be connected to the rotating stem 74 and to a saver sub 82.

An upper clamp assembly 76 can be disposed about and can lock the connection between the rotating stem 74 and the inside blow out preventer 78.

A lower clamp assembly 80 can be disposed about and can lock the connection between the inside blow out preventer 78 and the saver sub 82. Also shown are the elevator 60 and the rig floor 90.

Figure 3:
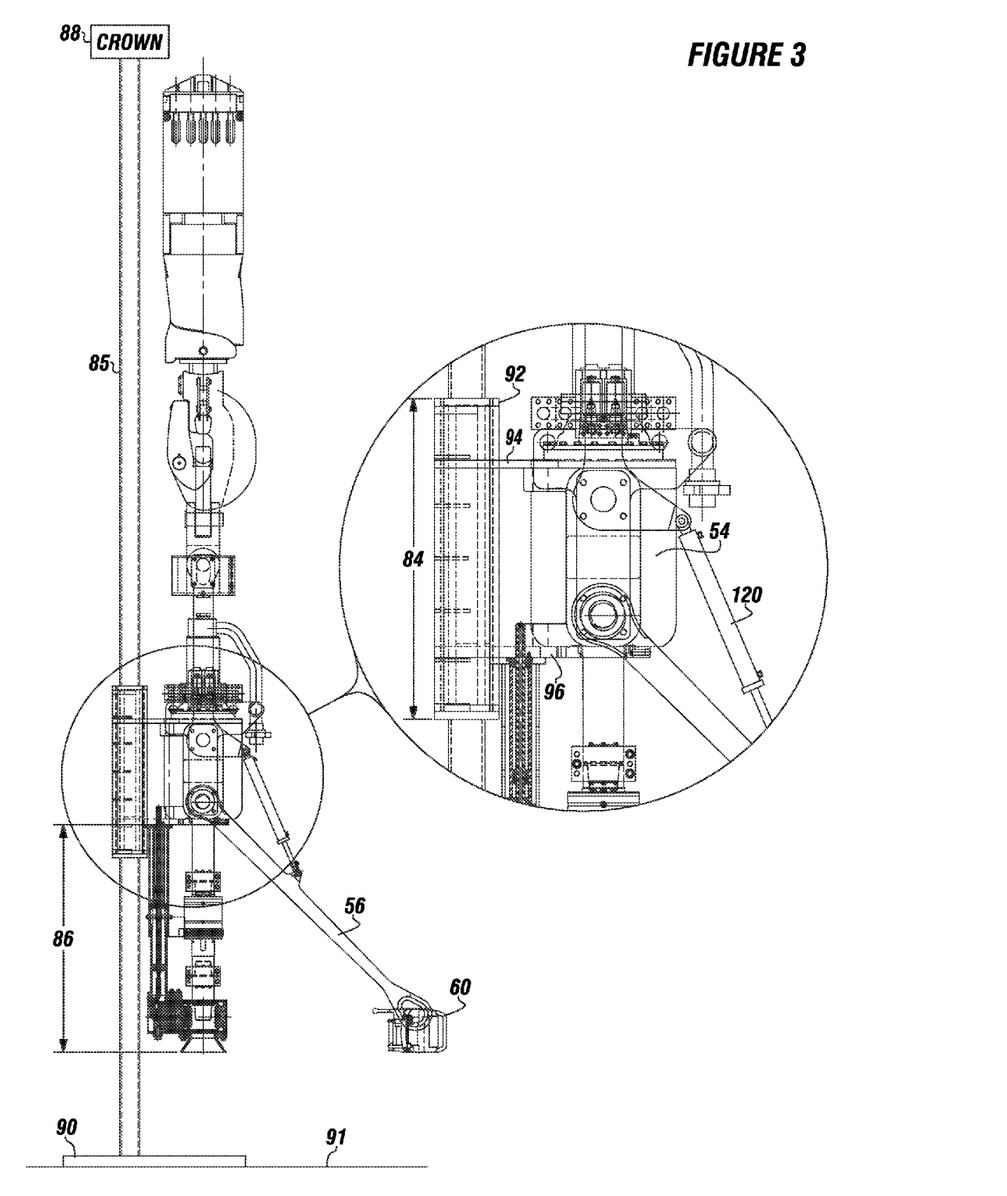
FIG. 3 depicts a top drive with a torque wrench assembly and a kick out elevator link that uses the torque measuring device according to one or more embodiments.

FIG. 3 depicts details of portions of the top drive. The top drive can include a torque wrench assembly 86 that can be connected to the top drive housing 54 and/or a torque slide assembly 84.

The torque slide assembly 84 can be configured to slide on a torque track 85. The torque track 85 can be suspended from a crown 88 of a derrick, and can be connected to the rig floor 90 and/or to the rig floor substructure 91.

The torque slide assembly 84 can include a slide body 92, a top plate 94 engaged with the top drive housing 54, and a bottom plate 96 engaged with the top drive housing 54.

The top drive can include an elevator hydraulic cylinder 120 connected to the elevator 60 and to the top drive housing 54 for kicking out the elevator 60 with the lower links, such as the lower link 56, to grab tubulars.

Figure 4:
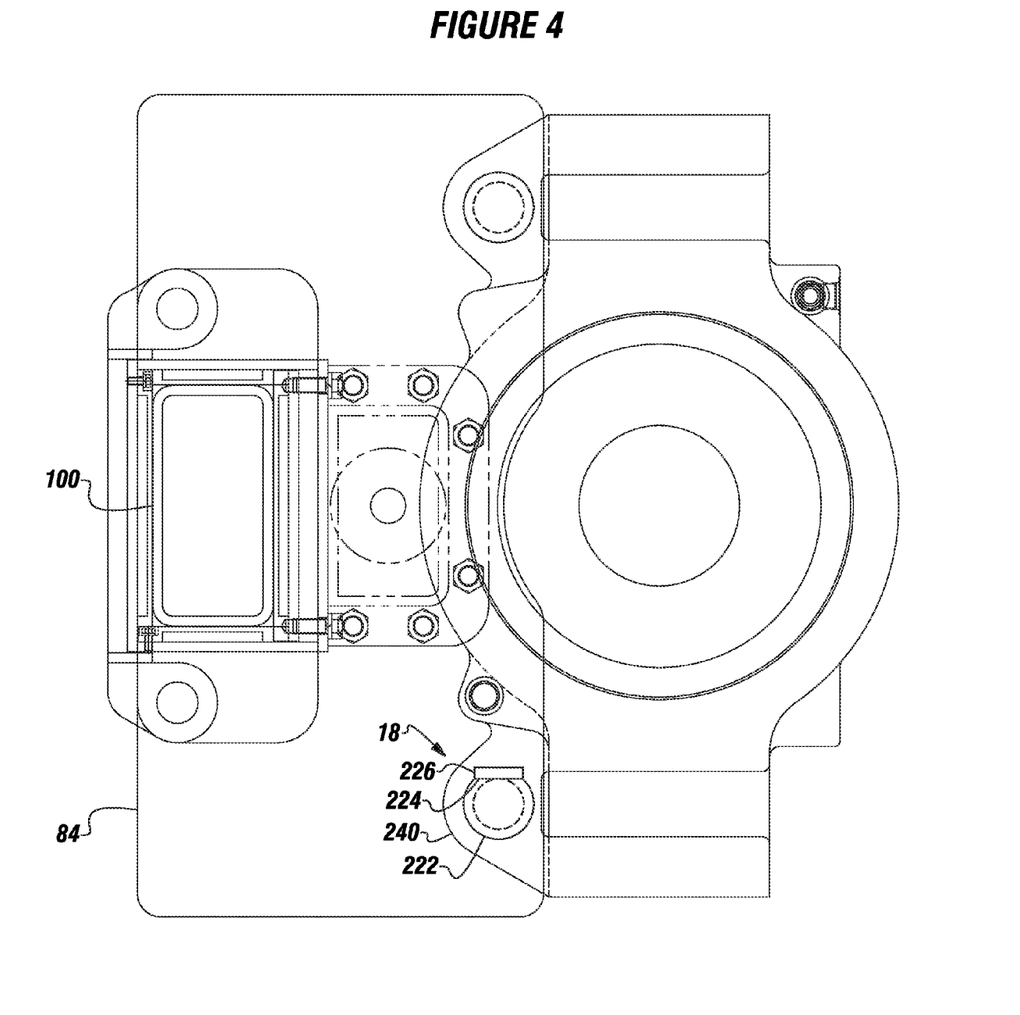
FIG. 4 depicts a top view of a top drive assembly with the torque measuring device.

FIG. 4 depicts a top view of the torque slide assembly 84 with a torque measuring device 18. A rectangular torque reaction tube 100 is shown.

A first boss 240 is depicted, along with a torque measuring pin head 222, a pin flat side 224, and a flat fixed surface 226. The pin flat side 224 can be for orientation against the flat fixed surface 226 of the first plate.

Figure 5A:
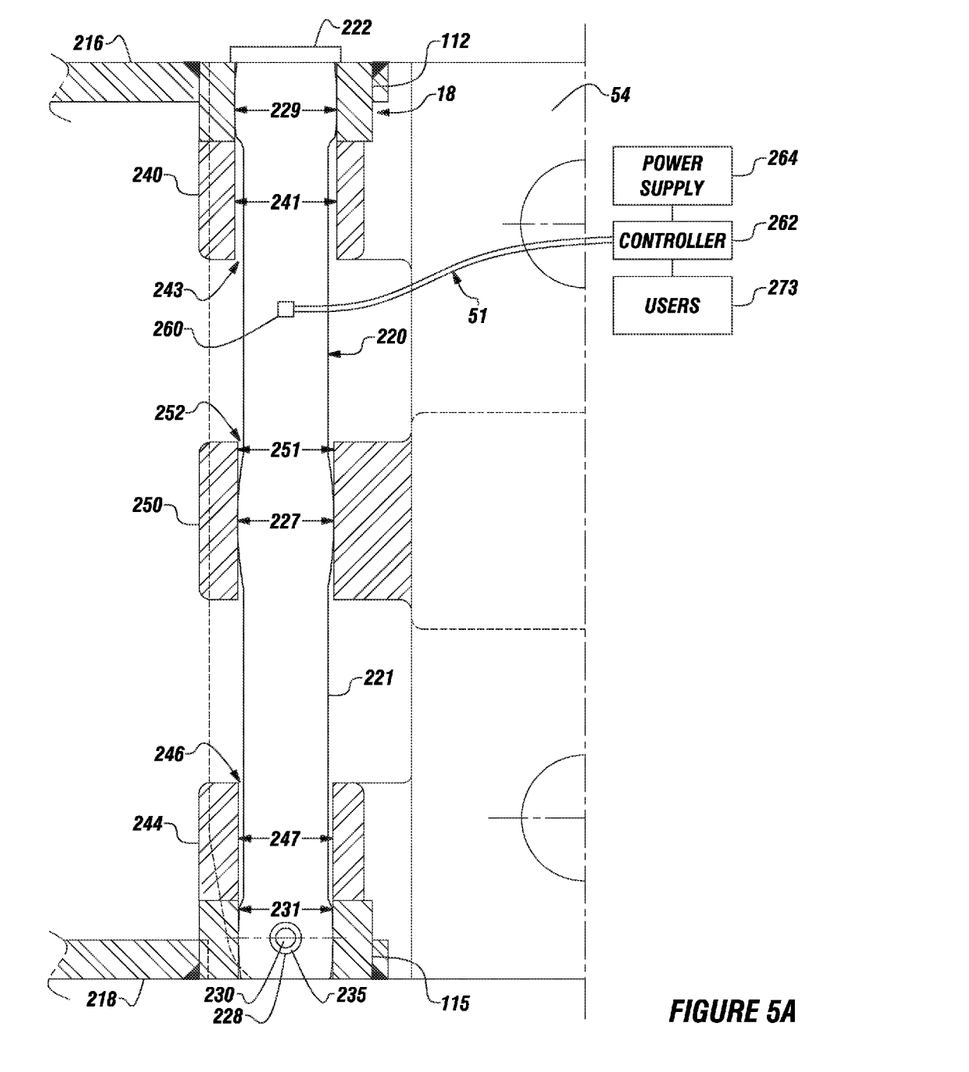
FIG. 5A depicts a cut view of a torque measuring pin.

FIG. 5A depicts a cut side view detail of the torque measuring device 18.

A first plate 216 and a second plate 218 are depicted.

A torque measuring pin 220 with a torque measuring pin head 222, a torque measuring pin body 221, a first pin diameter 227, a second pin diameter 229, and a third pin diameter 231, is depicted engaged with both the first plate 216 and the second plate 218. The three diameters of the torque measuring pin 220 can be used for ease of installation.

The torque measuring pin 220 can be made from steel, a heat treated steel, a durable alloy, or combinations thereof. The torque measuring pin 220 can have a length that is configured to span from the first plate 216 to the second plate 218 for engagement thereto.

The torque measuring pin head 222 can have a diameter that is slightly greater than the first pin diameter 227.

The torque measuring pin 220 can secure the torque slide assembly to the top drive housing 54.

The torque measuring pin body 221 can have a torque measuring pin hole 228 for engaging a first restraining member 230. The torque measuring pin hole 228 can include a flexible bushing 235 to centralize the first restraining member 230 in the torque measuring pin hole 228, and to hold the torque measuring pin head 222 above the first plate 216, thereby preventing dragging of the torque measuring pin head 222 when the torque measuring pin body 221 bends, which can change the accuracy of torque measurements.

A first boss 240 can be formed between the first plate 216 and the second plate 218 to restrain vertical movement between the first plate 216 and the second plate 218.

The first boss 240 can have a first bore 243 with a first bore diameter 241 that can be larger than the second pin diameter 229, enabling the torque measuring pin body 221 to easily drop into position. The first boss 240 can be positioned proximate to the first plate 216.

A second boss 244 can be formed and positioned near the second plate 218 to restrain axial movement between the first plate 216 and the second plate 218. The torque measuring pin 220 can be inserted into the second boss 244. The second boss 244 can have a second bore 246 aligned with the first bore 243.

The second bore 246 can have a second bore diameter 247. The second bore diameter 247 can be large enough to clear deflection of the torque measuring pin body 221.

A third boss 250 with a third bore 252 can have a third bore diameter 251 that can be equal to the first pin diameter 227 to snugly engage the torque measuring pin body 221 and allow the torque measuring pin 220 to bend when torque is applied simultaneously by the first plate 216 and the second plate 218. As such, the third boss 250 can react to the applied torque.

A top bushing 112 can connect to the first plate 216. A bottom bushing 115 can connect to the second plate 218. The top bushing 112 can be larger in diameter than the bottom bushing 115, such as from about 1% to about 10% larger.

A bidirectional strain gauge sensor 260 can be connected to the torque measuring pin body 221 between the first boss 240 and the third boss 250.

A controller 262 can be connected to the bidirectional strain gauge sensor 260 to receive signals over wires 51 from the bidirectional strain gauge sensor 260.

The controller 262 can be connected to a power supply 264 for detecting measurable bending of the torque measuring pin body 221, which can be calibrated in torque for detecting forward and reverse bending of the torque measuring pin body 221.

The controller 262 can transmit determined torque strain and compliance with preset limits to users 273 for use in operation of the top drive.

Figure 5B:
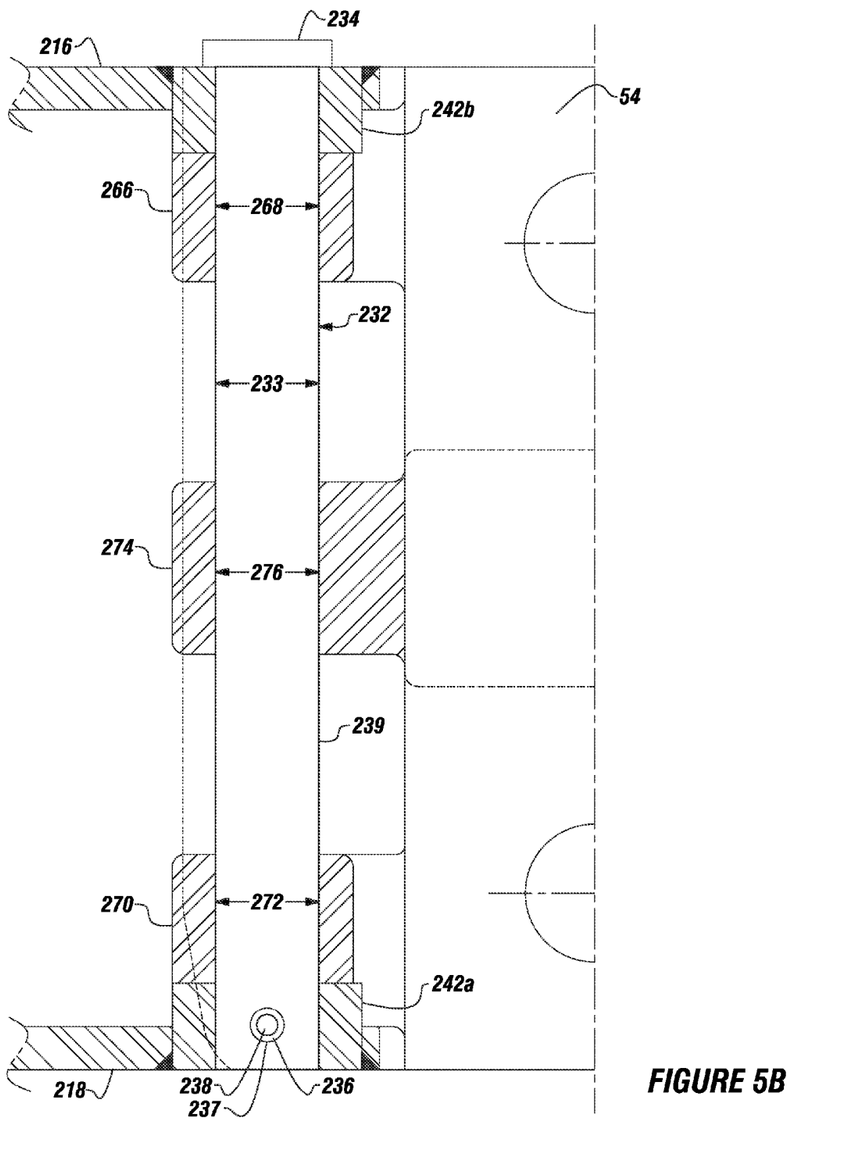
FIG. 5B depicts a cut view of a constant diameter hinge pin.

FIG. 5B depicts a cut side view detail of the constant diameter hinge pin 232. The constant diameter hinge pin 232 can have a hinge pin head 234, a hinge pin body 239, and a constant diameter 233.

The constant diameter hinge pin 232, including the hinge pin head 234 and the hinge pin body 239, can engage with the first plate 216 and the second plate 218. The constant diameter hinge pin 232 can secure the torque slide assembly to the top drive housing 54.

The constant diameter hinge pin 232 can have a second pin hole 237, a second restraining member 238, and a second flexible bushing 236.

A fourth boss 266 with a fourth boss bore diameter 268 can receive the constant diameter hinge pin 232 in a snug fit engagement.

A fifth boss 270 with a fifth boss bore diameter 272 can receive the constant diameter hinge pin body 239 in a snug fit engagement.

A sixth boss 274 with a sixth boss bore diameter 276 can receive the constant diameter hinge pin body 239 in a snug and secure engagement.

The fourth boss bore diameter 268, the fifth boss bore diameter 272, and the sixth boss bore diameter 276 can be equal.

Third bushings 242a and 242b can also have identical diameters.

Figure 5C:
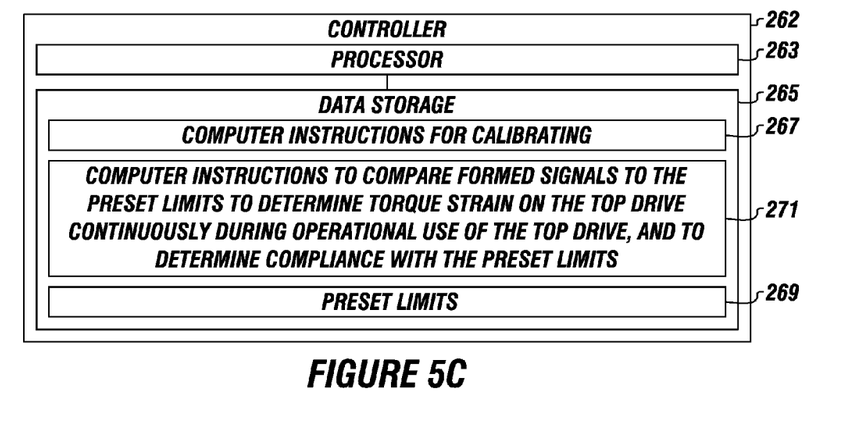
FIG. 5C depicts an embodiment of a controller.

FIG. 5C depicts an embodiment of the controller 262, which can measure strain determined by the bidirectional strain gauge sensor, and can calibrate the strain to a torque, such as in foot pounds.

The controller 262 can include a processor 263 with a data storage 265. The data storage 265 can include computer instructions for calibrating 267. The data storage 265 can include preset limits 269 stored therein.

The data storage 265 can also include computer instructions to compare formed signals to the preset limits to determine torque strain on the top drive continuously during operational use of the top drive, and to determine compliance with the preset limits 271.

The processor 263 can be configured to execute the computer instructions stored within the data storage 265.

Figure 6:
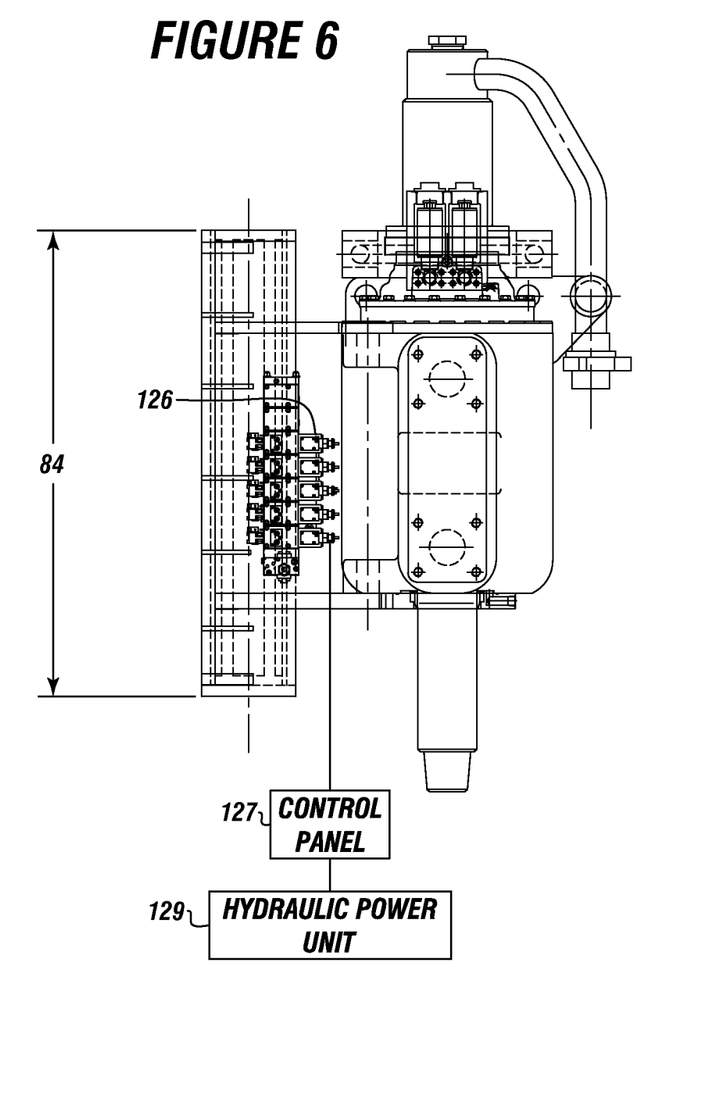
FIG. 6 depicts a detailed view of a torque slide assembly used with a top drive.

FIG. 6 depicts a view of a portion of the top drive. One or more solenoid valves 126 can be mounted to the torque slide assembly 84. The solenoid valves 126 can be connected to a control panel 127 for operating the top drive.

A hydraulic power unit 129 can be in communication with the control panel 127 for powering the top drive.

Figure 7:
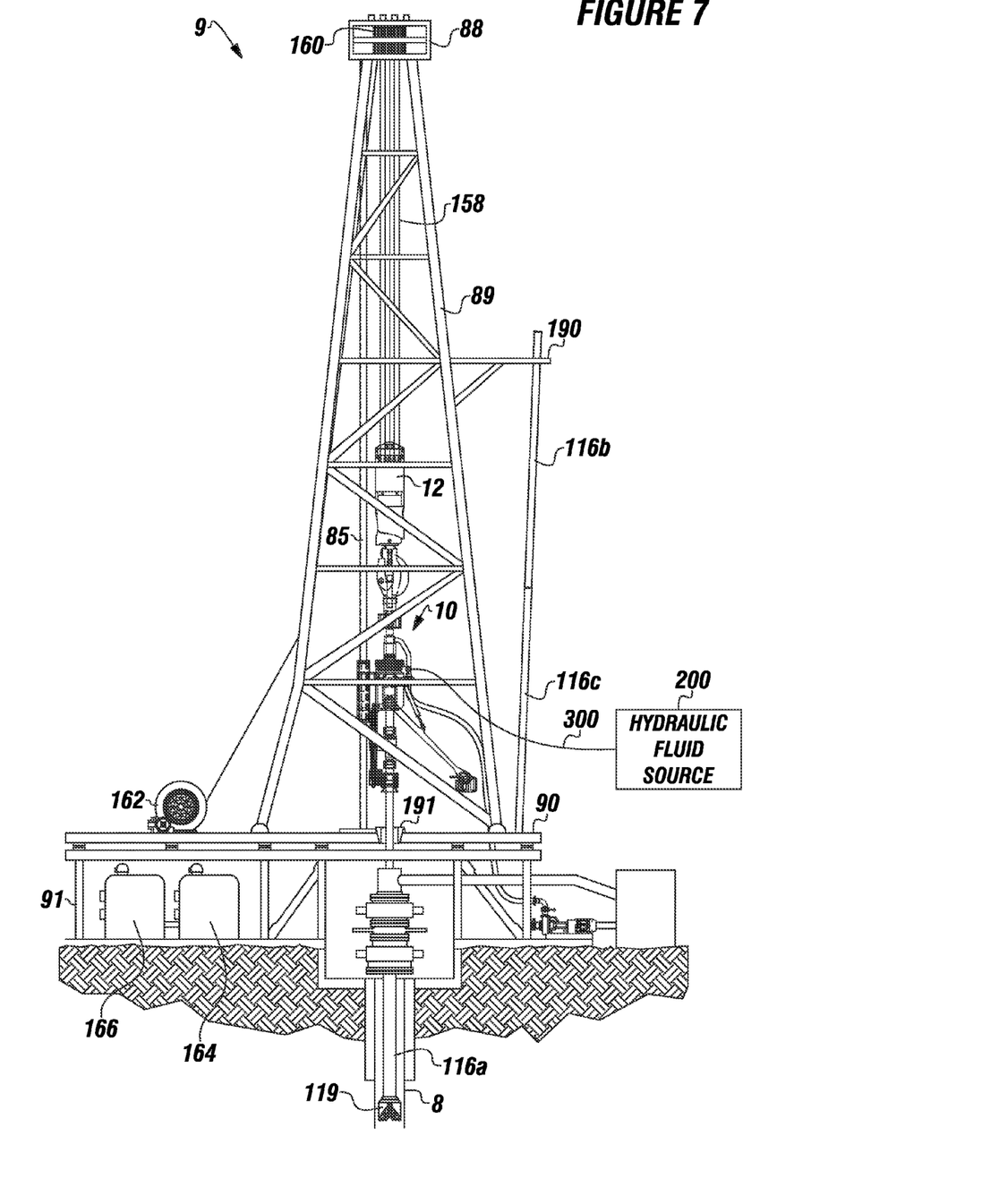
FIG. 7 depicts a top drive with the torque measuring device installed on a drilling rig.

FIG. 7 depicts a drilling rig 9 with a derrick 89. The drilling rig 9 can include the rig floor 90 and the rig floor substructure 91.

A traveling block 12 can be secured to a cable 158. The cable 158 can extend from the traveling block 12 over at least one sheave 160 mounted to a top of the derrick 89 at the crown 88. The cable 158 can be connected to a drawworks 162.

The drawworks 162 can be connected to a drawworks motor 164 for turning the drawworks 162, and for raising or lowering the traveling block 12. The drawworks motor 164 can be energized from a power supply 166.

The travelling block can be in connection with the top drive 10. The top drive 10 can slidingly engage the torque track 85.

A tubular 116a can be engaged with the top drive 10 at one end, and with a drill bit 119 on the other end within the wellbore 8.

A stand of tubulars, including tubular 116b and 116c, is shown stacked in a racking position 190 on the rig floor 90.

A hydraulic fluid source 200 for powering the top drive 10 is shown with a conduit 300. Also depicted are slips 191.

While these embodiments have been described with emphasis on the embodiments, it should be understood that within the scope of the appended claims, the embodiments might be practiced other than as specifically described herein.

What is claimed is:

1. A top drive with a top drive housing for use in drilling a well, wherein the top drive comprises a torque measuring device, and wherein the torque measuring device comprises:
   a. a first plate mounted to the top drive housing and a second plate mounted to the top drive housing opposite the first plate;
   b. a torque measuring pin comprising a pin head having a flat side for orientation against a surface of the first plate and a pin body, wherein the torque measuring pin engages with the first plate, a torque slide assembly of the top drive, and the second plate for securing the torque slide assembly to the top drive housing;
   c. a hinge pin comprising a hinge pin head and a hinge pin body, wherein the hinge pin engages with the first plate, the torque slide assembly, and the second plate for securing the torque slide assembly of the top drive to the top drive housing;
   d. a first boss connected to the top drive housing, wherein the first boss has a first bore with a first bore diameter, wherein the torque measuring pin engages the first plate through the first bore without engaging the first bore, and wherein the first boss is configured to restrain vertical movement between the first plate and the second plate when torque is applied to the top drive;
   e. a second boss connected to the top drive housing and aligned with the first boss, wherein the second boss has a second bore with a second bore diameter, wherein the torque measuring pin engages the second plate through the second bore without engaging the second bore, and wherein the second boss is configured to restrain axial movement between the first plate and the second plate when torque is applied to the top drive;
   f. a third boss connected to the top drive housing between the first boss and the second boss, wherein the third boss is aligned with the first boss and the second boss, wherein the third boss has a third bore with a third bore diameter, wherein the torque measuring pin engages through the third boss, and wherein the third bore is configured to engage the torque measuring pin body to bend the torque measuring pin when torque is applied to the top drive;
   g. a fourth boss connected to the top drive housing in parallel with the first boss, wherein the fourth boss has a fourth bore with a fourth bore diameter, wherein the hinge pin engages through the fourth boss to hinge the first plate and the second plate to the top drive housing;

h. a fifth boss connected to the top drive housing in parallel with the second boss, wherein the fifth boss has a fifth bore with a fifth bore diameter, wherein the hinge pin engages through the fifth boss to hinge the first plate and the second plate to the top drive housing;

i. a sixth boss connected to the top drive housing in parallel with the third boss, wherein the sixth boss has a sixth bore with a sixth bore diameter, wherein the hinge pin engages through the sixth boss to hinge the first plate and the second plate to the top drive housing;

j. a bidirectional strain gauge sensor engaged with the torque measuring pin for measuring strain on the torque measuring pin to form signals; and k. a controller in communication with the bidirectional strain gauge sensor for receiving the formed signals.

2. The top drive of claim 1, further comprising:

a. a first pin hole in the pin body for engaging a first restraining member;

b. a flexible bushing in the first pin hole to centralize the first restraining member in the first pin hole and to hold the pin head above the first plate preventing dragging of the pin head when the pin body bends, thereby ensuring accuracy of torque measurements; and c. a second pin hole in the hinge pin body for engaging a second restraining member.

3. The top drive of claim 1, wherein the hinge pin has a constant diameter.

4. The top drive of claim 1, wherein the torque measuring pin is made of a metal alloy.

5. The top drive of claim 1, wherein the second bore diameter is configured to allow deflection of the torque measuring pin body without engaging the torque measuring pin body.

6. The top drive of claim 1, wherein the third bore diameter is equal to a diameter of the torque measuring pin proximate the third bore allowing the torque measuring pin to bend when torque is applied to the torque measuring pin simultaneously by the first plate and the second plate, and allowing the third boss to react to the applied torque.

7. The top drive of claim 1, wherein the controller is calibrated to detect forward and reverse bending of the torque measuring pin from the formed signals.

8. The top drive of claim 1, further comprising a top bushing connected to the first plate and a bottom bushing connected to the second plate, wherein the top bushing has a larger diameter than the bottom bushing.

9. The top drive of claim 1, wherein the controller comprises a processor with a data storage, computer instructions for calibrating in the data storage, and preset limits stored in the data storage.

10. The top drive of claim 9, wherein the processor is configured to execute computer instructions in the data storage to compare the formed signals to the preset limits to determine torque strain on the top drive continuously during operational use of the top drive, and to determine compliance with the preset limits.

11. The top drive of claim 10, wherein the controller transmits the determined torque strain and compliance with preset limits to users for use in operation of the top drive.

12. A top drive with a top drive housing for use in drilling a well, wherein the top drive comprises a torque measuring device, and wherein the torque measuring device comprises:

a. a first plate mounted to the top drive housing of the top drive;

b. a second plate mounted to the top drive housing opposite the first plate;

c. a torque measuring pin and a hinge pin, wherein both the torque measuring pin and the hinge pin are engaged with: the first plate, a torque slide assembly of the top drive, and the second plate to secure the torque slide assembly to the top drive housing;

d. a first boss connected to the top drive housing, wherein the torque measuring pin is engaged through the first boss without engaging the first boss, and wherein the first boss is configured to restrain vertical movement between the first plate and the second plate when torque is applied to the top drive;

e. a second boss connected to the top drive housing and aligned with the first boss, wherein the torque measuring pin is engaged through the second boss without engaging the second boss, and wherein the second boss is configured to restrain axial movement between the first plate and the second plate when torque is applied to the top drive;

f. a third boss connected to the top drive housing between the first boss and the second boss, wherein the third boss is aligned with the first boss and the second boss, wherein the torque measuring pin is engaged through the third boss, and wherein the third bore is configured to engage the torque measuring pin to bend the torque measuring pin when torque is applied to the top drive;

g. a fourth boss connected to the top drive housing, wherein the hinge pin engages through the fourth boss to hinge the first plate and the second plate to the top drive housing;

h. a fifth boss connected to the top drive housing, wherein the hinge pin engages through the fifth boss to hinge the first plate and the second plate to the top drive housing;

i. a sixth boss connected to the top drive housing, wherein the hinge pin engages through the sixth boss to hinge the first plate and the second plate to the top drive housing;

j. a bidirectional strain gauge sensor engaged with the torque measuring pin for measuring strain on the torque measuring pin to form signals; and k. a controller in communication with the bidirectional strain gauge sensor for receiving the formed signals.

13. The top drive of claim 12, further comprising:

a. a first pin hole in the torque measuring pin for engaging a first restraining member;

b. a flexible bushing in the first pin hole to centralize the first restraining member in the first pin hole and to hold a pin head of the torque measuring pin above the first plate preventing dragging of the pin head when the torque measuring pin bends, thereby ensuring accuracy of torque measurements; and c. a second pin hole in the hinge pin for engaging a second restraining member.

14. The top drive of claim 12, wherein the hinge pin has a constant diameter.

15. The top drive of claim 12, wherein the controller is calibrated to detect forward and reverse bending of the torque measuring pin from the formed signals.

16. The top drive of claim 12, further comprising a top bushing connected to the first plate and a bottom bushing connected to the second plate, wherein the top bushing has a larger diameter than the bottom bushing.

17. The top drive of claim 12, wherein the controller comprises a processor with a data storage, computer instructions for calibrating in the data storage, and preset limits stored in the data storage.

18. The top drive of claim 17, wherein the processor is configured to execute computer instructions in the data storage to compare the formed signals to the preset limits to determine torque strain on the top drive continuously during operational use of the top drive, and to determine compliance with the preset limits.

19. The top drive of claim 17, wherein the controller transmits the determined torque strain and compliance with preset limits to users for use in operation of the top drive.

20. A top drive with a top drive housing for use in drilling a well, wherein the top drive comprises a torque measuring device, and wherein the torque measuring device comprises:
  a. a first plate opposite a second plate mounted to the top drive housing;
  b. a torque measuring pin comprising:
     (i) a torque measuring pin head having a pin flat side for orientation against a flat fixed surface of the first plate; and
     (ii) a torque measuring pin body for securing a torque slide assembly of the top drive to the top drive housing;
  c. a constant diameter hinge pin comprising:
     (i) a hinge pin head; and
     (ii) a hinge pin body for securing the torque slide assembly of the top drive to the top drive housing;
  d. a first boss connected to the top drive housing to restrain vertical movement between the first plate and the second plate when torque is applied to the top drive, wherein the first boss has a first bore with a first bore diameter to allow the torque measuring pin to pass through the first bore without touching the first bore;
  e. a second boss connected to the top drive housing to restrain axial movement between the first plate and the second plate when torque is applied to the top drive, wherein the second boss has a second bore with a second bore diameter aligned with the first bore, and wherein the second bore diameter allows the torque measuring pin to pass through the second bore without touching the second bore;
  f. a third boss connected to the top drive housing between the first boss and the second boss, wherein the third boss provides central bending contact to the torque measuring pin, wherein the third boss has a third bore with a third bore diameter aligned with the first bore and the second bore, and wherein the third bore diameter engages the torque measuring pin body and allows bending of the torque measuring pin when torque is applied to the top drive;
  g. a fourth boss connected to the top drive housing in parallel with the first boss to hinge the first plate and the second plate to the top drive housing, wherein the fourth boss has a fourth bore with a fourth bore diameter to receive the hinge pin body in a close alignment;
  h. a fifth boss connected to the top drive housing in parallel with the second boss to hinge the first plate and the second plate to the top drive housing, wherein the fifth boss has a fifth bore with a fifth bore diameter to receive the hinge pin body in a close alignment;
  i. a sixth boss connected to the top drive housing in parallel with the third boss to hinge the first plate and the second plate to the top drive housing, wherein the sixth boss has a sixth bore with a sixth bore diameter to receive the hinge pin body in a close alignment, and wherein the fourth boss, the fifth boss, and the sixth boss have the same diameter;
  j. a bidirectional strain gauge sensor connected to the torque measuring pin for measuring strain on the torque measuring pin to form signals; and
  k. a controller in communication with the bidirectional strain gauge for receiving the signals from the bidirectional strain gauge.

\* \* \* \* \*